United States Patent [19]
Sterling

[11] 3,710,920
[45] Jan. 16, 1973

[54] CLOSURE HANDLING APPARATUS
[75] Inventor: Walter S. Sterling, Quincy, Mass.
[73] Assignee: Pneumatic Scale Corporation, Quincy, Mass.
[22] Filed: March 16, 1970
[21] Appl. No.: 19,741

[52] U.S. Cl. .............................198/33 AA, 221/158
[51] Int. Cl. ..............................................B65g 47/24
[58] Field of Search......221/160, 161, 173, 233, 278, 221/156–159; 198/33 AA; 193/43 R, 43 C

[56] References Cited

UNITED STATES PATENTS

| | | | |
|---|---|---|---|
| 3,337,089 | 8/1967 | Bronfnian | 221/160 |
| 3,012,651 | 12/1961 | Hawkes | 221/160 X |
| 2,904,162 | 9/1959 | Simer | 221/160 X |

FOREIGN PATENTS OR APPLICATIONS 277,347  11/1912  Germany............................198/33.1

Primary Examiner—Samuel F. Coleman
Assistant Examiner—L. Martin
Attorney—Robert R. Churchill

[57] ABSTRACT

Closure handling apparatus arranged to effect orientation of elongated cylindrical closures which are greater in length than in diameter and in which the weight is substantially uniformly distributed throughout the length thereof. Closures are received in radially arranged pockets in either an oriented or non-oriented position, provision being made for rejecting from their pockets the non-oriented closures.

6 Claims, 13 Drawing Figures

INVENTOR
Walter S. Sterling
BY Robert R. Churchill
ATTORNEY

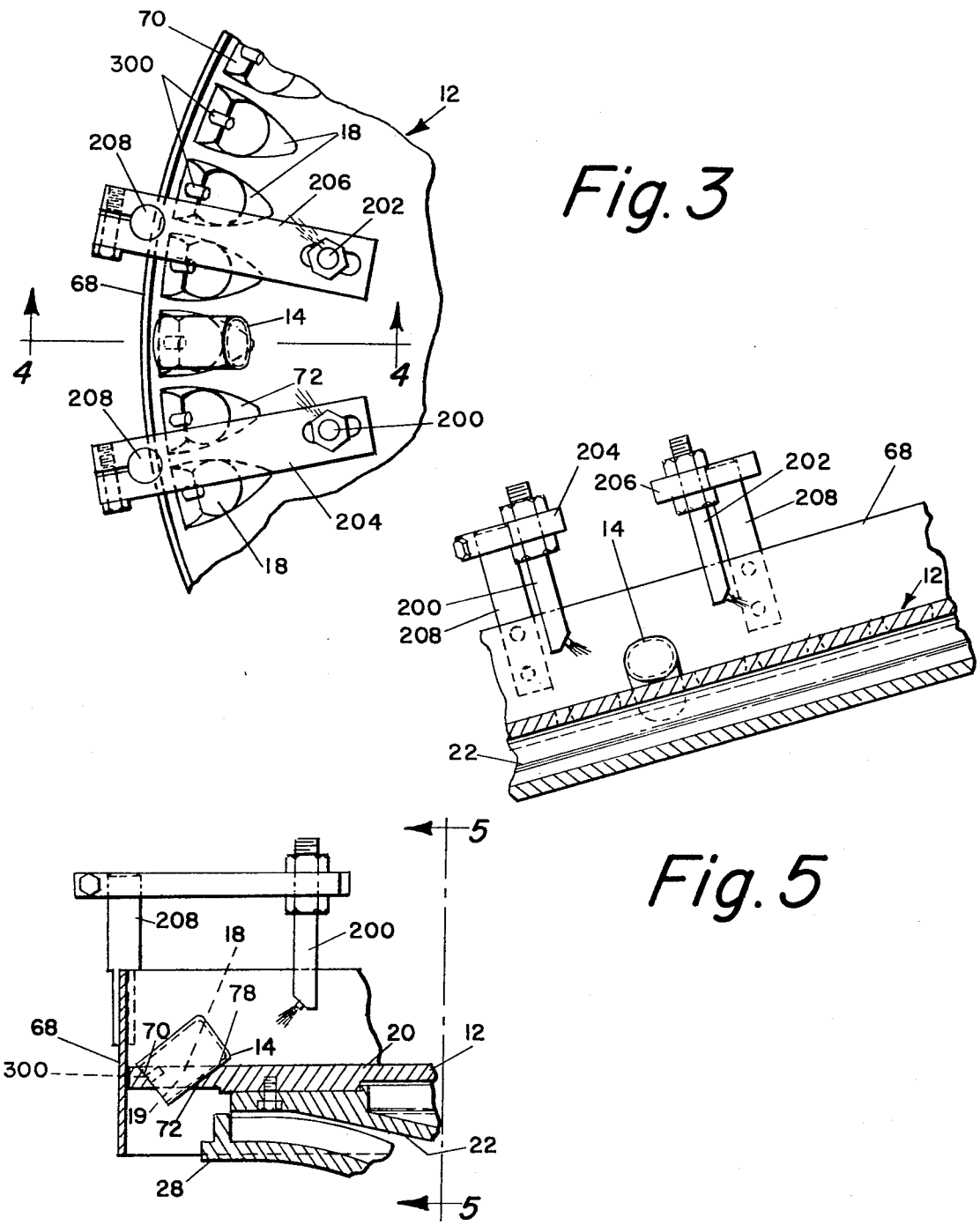

PATENTED JAN 16 1973

INVENTOR
Walter S. Sterling

BY Robert R. Churchill

ATTORNEY 3,710,920

CLOSURE HANDLING APPARATUS

BACKGROUND OF THE INVENTION

1. Field of the Invention

The present invention relates to closure handling and orienting apparatus adapted to receive a supply of randomly arranged closures and to orient the same prior to depositing the closures into a supply chute from which successive closures are withdrawn for application to containers.

2. Description of the Prior Art

Prior closure handling apparatus of the same general type is exemplified in U.S. Pat. No. 2,715,978, issued to Walter S. Sterling and assigned to the present assignee. Such prior apparatus takes the form of an inclined rotary disk onto which randomly or haphazardly arranged closures are deposited from a bulk supply thereof. In operation, the closures carried up the rotary inclined disk are guided to be received between the beveled edge of a relatively small disk rotated in a substantially horizontal plane and a cooperating rail. Those closures which assume an oriented position between the beveled edge of the disk and the rail are enabled to maintain a position of equilibrium between the rail and the disk and are deposited into a chute for delivery to a closure applying machine. Those closures which assume a position other than an oriented position between the disk and the rail are overbalanced to fall onto the lower end of the inclined rotary disk to be again carried up and guided between the horizontal disk and the rail.

In such prior apparatus, the closures are arranged to be oriented in a natural or inherent position of equilibrium which may vary with different sizes and shapes of closures, and which may also vary in their distribution of weight, that is, one end may be heavier than the other, for example. In practice, the disk and rail device of the prior art effects removal from a group of randomly arranged closures only those closures which inherently assume an oriented position, those closures assuming a position other than a desired position of orientation being rejected to be returned to the lower end of the inclined disk where they join with and are jostled by other closures to change their positions and to be again carried up the incline until they assume a desired position of orientation. In operation, it has been found that a great majority of the closures tend to assume a natural and substantially uniform position of rest or equilibrium in the desired position of orientation so that the efficiency of the apparatus is surprisingly high. However, relatively large closures of different shapes and weights cannot be conveniently handled on the prior disk and rail type of apparatus in its present form.

SUMMARY OF THE INVENTION

The present invention contemplates container handling apparatus particularly adapted for handling and orienting elongated, narrow cylindrical closures which are substantially greater in length than in diameter and in which the weight is substantially uniformly distributed throughout the length thereof. In practice the elongated narrow closures which the present apparatus is adapted to handle tend to assume an at rest position lying on their sides so that they tend to roll on the inclined rotary disk, provision being made for causing those closures standing on end to assume a lying down position.

In accordance with the present invention, the apparatus provides a series of closely spaced, radially arranged pockets adjacent the periphery of the inclined rotary carrier into which the closures will fall or roll to be carried upwardly with the carrier. In operation, when a randomly arranged closure deposited at the lower end of the carrier falls by chance into a pocket with its open end facing radially outwardly, it will be properly seated in the pocket in the desired position of orientation and in condition to be guided into a chute at the upper end of the rotary carrier. Those closures which are received in a pocket in other than an oriented position are arranged to be rejected therefrom at the upper portion of the inclined carrier prior to arriving at the mouth of the chute.

Accordingly, the present invention has for an object to provide novel and improved closure handling apparatus particularly adapted for handling and orienting elongated cylindrical closures in which the weight is substantially uniformly distributed throughout the length thereof.

The invention has for a further object to provide novel and improved closure handling apparatus of the character specified having provision for rejecting those closures which do not assume an oriented position in the pocket, and for transferring the oriented closures from the pockets into a chute.

With these general objects in view and such others as may hereinafter appear, the invention consists in the closure handling apparatus and in the various structures, arrangements and combinations of parts as hereinafter described and particularly defined in the claims at the end of this specification.

BRIEF DESCRIPTION OF THE DRAWINGS

In the drawings illustrating the preferred embodiment of the invention:

FIG. 3 is a plan view detail of the air jets for maneuvering the closures into a radial position on the carrier;

FIG. 4 is a detail view in cross section taken on the line 4—4 of FIG. 3 of a pocket showing a closure in an oriented position;

FIG. 5 is a detail view in side elevation as viewed from the line 5—5 of FIG. 4;

DESCRIPTION OF THE PREFERRED EMBODIMENTS

Figure 1:
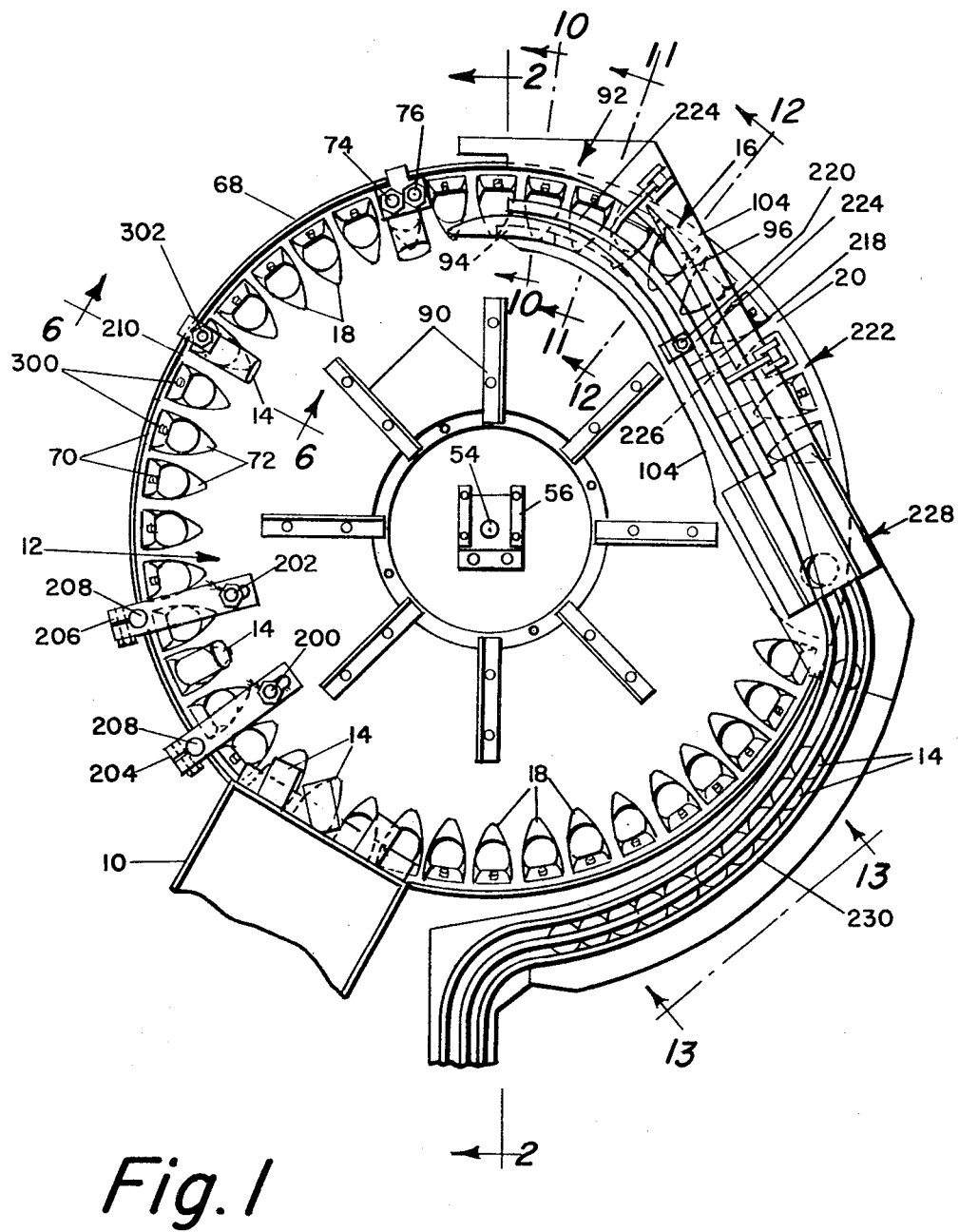
FIG. 1 is a plan view of closure handling apparatus embodying the present invention.
Figure 2:
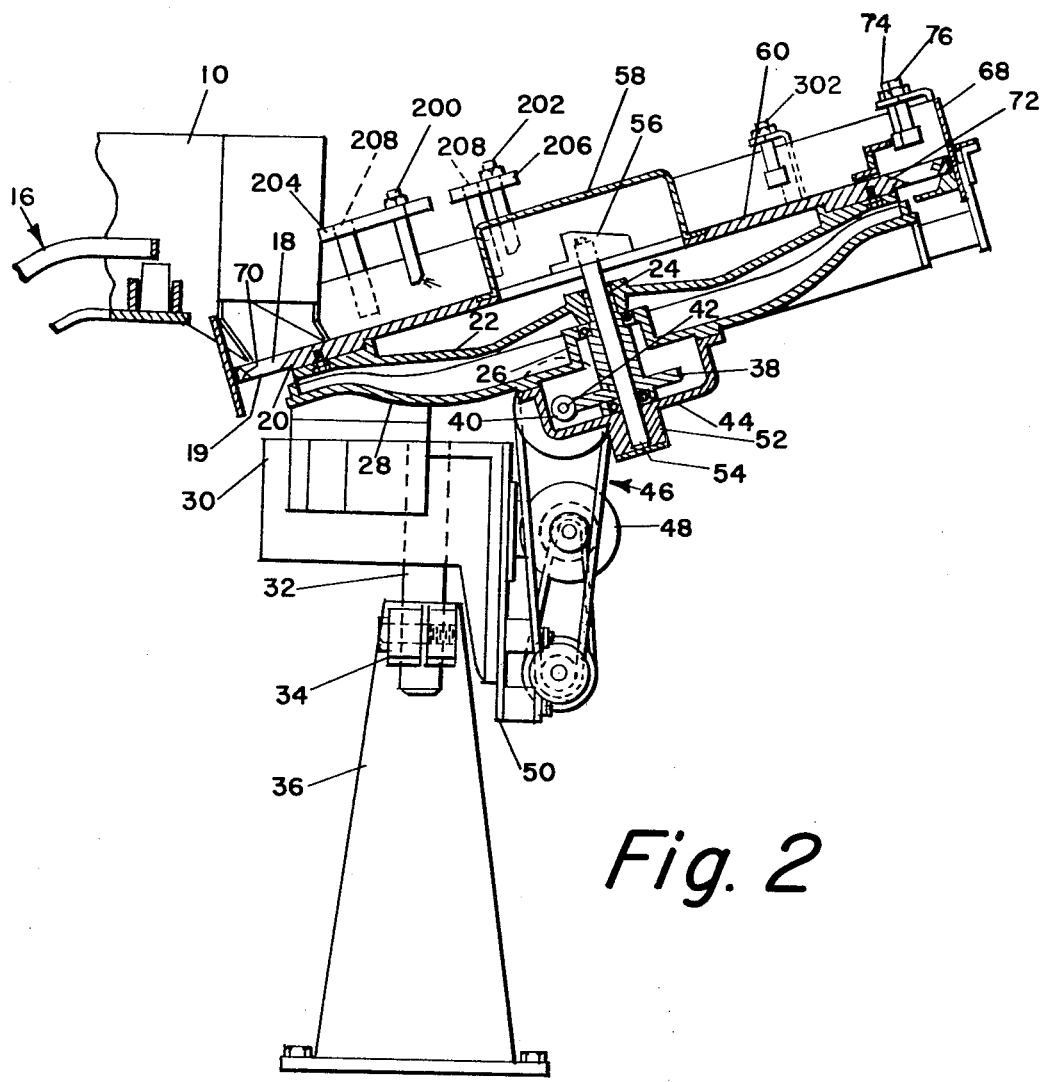
FIG. 2 is a cross sectional view of the apparatus taken on the line 2—2 of FIG. 1.

Referring now to the drawings and particularly to FIGS. 1 and 2, the closure handling machine therein shown comprises, in general, a hopper 10 in which a bulk supply of closures are stored, and a rotary carrier indicated generally at 12 arranged at an inclined plane and which is adapted to carry upwardly closures 14 deposited by the hopper 10 in which a bulk supply of closures are stored, and a rotary carrier indicated generally at 12 arranged at an inclined plane and which is adapted to carry upwardly closures 14 deposited by the hopper at the lower end of the carrier. As herein shown, the rotary carrier 12 is provided with a plurality of closely spaced and radially arranged pockets 18 adjacent the marginal edge thereof, each pocket being shaped to receive and retain a closure and to carry the closure upwardly as described. Those closures assuming a desired position of orientation in their pockets are deposited into the open end of a chute 16 disposed at the upper end of the carrier.

The particular closure 14 which the present apparatus is adapted to handle comprises an elongated cylindrical closure open at one end, the weight of the closure being substantially uniform throughout the length thereof. In practice, each pocket 18 is angularly disposed with respect to the plane of the upper surface of the carrier and is shaped in cross section to conform substantially to the shape of a closure disposed on its side with one end directed radially outwardly and downwardly, the other end directed radially inwardly and upwardly. As illustrated in FIG. 4, each pocket 18 is substantially V-shaped in cross section, one leg 70 disposed adjacent the periphery of the carrier being shorter than the other leg 72 which latter is directed inwardly and upwardly, terminating at a point of intersection with the upper surface of the carrier as indicated at 78. FIG. 4 also illustrates the present closure 14 in the desired position of orientation, that is, with the open end resting against the wall defined by the shorter leg 70, and with the closed end facing upwardly and inwardly as shown.

The rotary carrier 12 includes an annular member 20 in which the pockets 18 are formed and which is secured to a flange 22 keyed to a sleeve 24 rotatably mounted in a bearing 26 formed in a supporting disk 28. The disk 28 is attached to a bracket 30, the latter being secured to the upper end of a shaft 32 which in turn may be adjustably supported in a clamp 34 formed in a supporting column 36. The sleeve 24 is formed integrally with a worm wheel 38 arranged to mesh with a worm gear 40 fast on a shaft 42 journaled in a gear box 44 secured to the underside of the supporting disk 28. The shaft 42 is connected by a belt and pulley drive 46 to a variable speed motor unit 48 adjustably secured to a depending portion 50 of the bracket 30. The gear box 44 is provided with a hub 52 arranged to support a central stationary shaft 54 extending upwardly through the sleeve 24.

As shown in FIG. 2, the upper end of the stationary shaft 54 is arranged to support a bracket 56 forming part of the conventional sorting or orienting unit. In the present apparatus, the sorting unit is removed and a cover member 58 is fitted over the stationary bracket 56 as shown. As herein illustrated, the annular member 20 is extended inwardly towards the center of the carrier, as indicated at 60, the cover member 58 being attached to the inner marginal edge of the annular member. The supporting disk 28 is provided with an upstanding retaining band 68 surrounding and extending above the upper surface of the carrier 12 for confining the closures on the carrier.

The illustrated supply hopper 10 is supported adjacent the lower end of the carrier 12 and is provided with an opening through which the closures may flow by gravity onto the carrier. Any type of hopper containing a bulk supply of randomly arranged closures may be employed including those wherein provision is made for controlling the release of closures onto the carrier such as is illustrated and described in the U.S. Pats. to Walter S. Sterling, No. 3,079,042; No. 3,164,291; and No. 3,164,292.

In operation, the majority of the herein described closures 14 deposited on the lower end of the inclined carrier 12 lie or fall on their side and as the continuously moving carrier 12 carries the closures along therewith, some of the closures tend to roll or gravitate into the radially arranged pockets 18. Each pocket is provided with an opening 19 at the bottom thereof through which a portion of the closure carried by the pocket extends.

In accordance with a feature of the present invention, provision is made for maneuvering the randomly arranged closures 12 to cause them to roll into the pockets 18 as the closures are carried up on the inclined carrier 14. As herein illustrated, the randomly arranged closures deposited on the carrier may take any position thereon, some even standing on end and some being piled one above the other. Some of those closures which lie on their sides may by chance fall or roll into the radially arranged pockets 18 as they are carried up the incline by the rotary carrier.

It will be understood that only a relatively few closures will fall by chance into an oriented position in the radially arranged pockets. As herein shown, the means for maneuvering the randomly arranged closures into a substantially radial position to cause them to roll into the pockets comprises a pair of spaced air jets 200, 202 disposed at a point near the lower end of the carrier immediately beyond the closure delivery opening of the hopper. The air jets are adjustably supported in spaced radially arranged brackets 204, 206, respectively, which in turn are clamped to upright rods 208 bolted to the retaining band 68 as shown.

As illustrated in plan in FIG. 3, the air jets 200, 202 are supported about 3 to 4 inches radially inwardly from the retaining band 68 and about 1 inch to 2 inches above the face of the carrier, the distances being variable according to the size of the closure. It was found in practice that with the air jets thus disposed and with the air directed laterally toward the retaining band 68 and at a slight angle upwardly when viewed in plan, the randomly arranged closures will be caused to assume a radial position on the carrier to facilitate engagement with the pockets 18.

In practice, some of the radially arranged closures will be disposed in their pockets in the desired position of orientation, that is, with the open end seated against the angular end wall 70, and some of the closures will be disposed in a reversed or non-oriented position. In accordance with the present invention, provision is made for preventing seating of a non-oriented closure against the end wall 70 whereby to retain such closure in an elevated position where it can be conveniently rejected from its pocket by an air stream in a manner such that a correctly positioned closure in a pocket will not be disturbed. As herein shown, the provision for preventing seating of a non-oriented closure 14 in its pocket 18 comprises a pin or other projection 300 extended from the end wall 70 of the pocket. As thus constructed, it will be evident that a closure which is received in a pocket with its open end facing the end wall 70 will go over the pin 300 so as to permit full seating of the closure in the pocket. On the other hand, when a non-oriented or reversed closure is received in a pocket 18 with its closed end facing the end wall 70, the closure will rest against the end of the pin 300 to prevent seating thereof.

Figure 7:
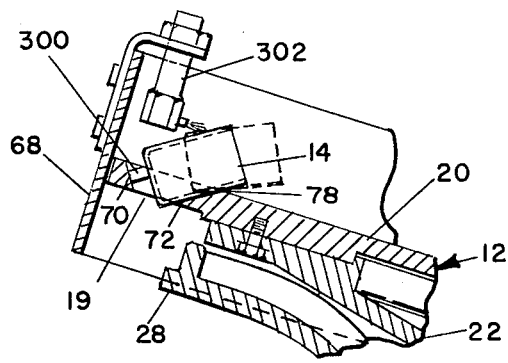
FIG. 7 is a cross sectional view similar to FIG. 6 showing a non-oriented closure being rejected from its pocket.
Figure 8:
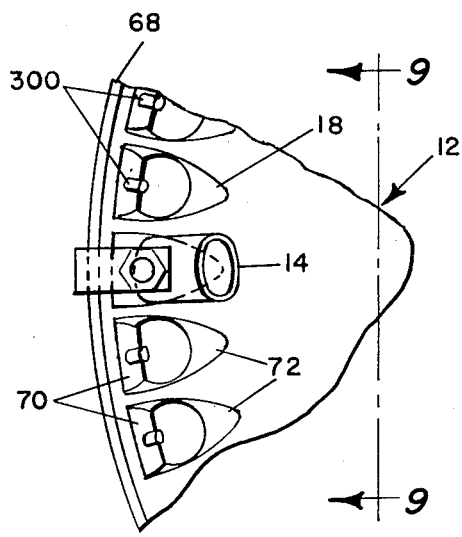
FIG. 8 is a plan view detail showing the rejecting station.
Figure 9:
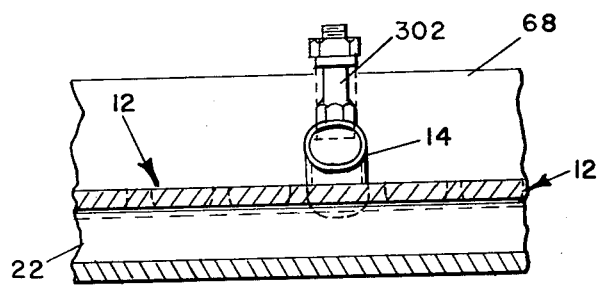
FIG. 9 is an end view of the rejecting station as seen from the line 9—9 of FIG. 8.
Figure 10:
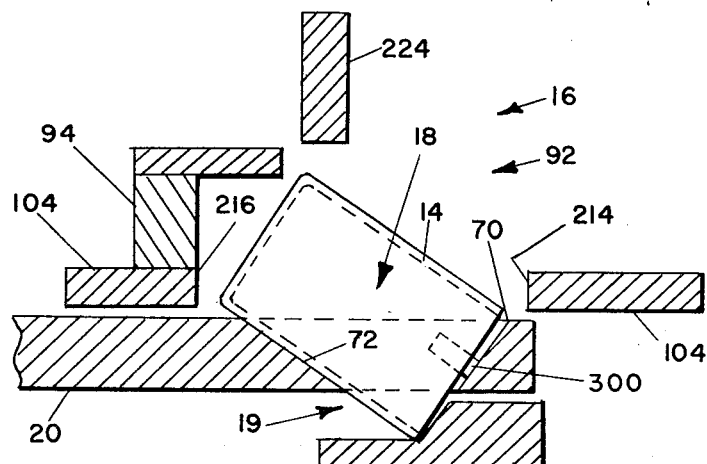
FIGS. 10, 11 and 12 are cross sectional views taken on the lines 10—10, 11—11 and 12—12 of FIG. 1 showing in sequence the shape of the guide elements for transferring the closures from the pockets into the chute.
Figure 11:
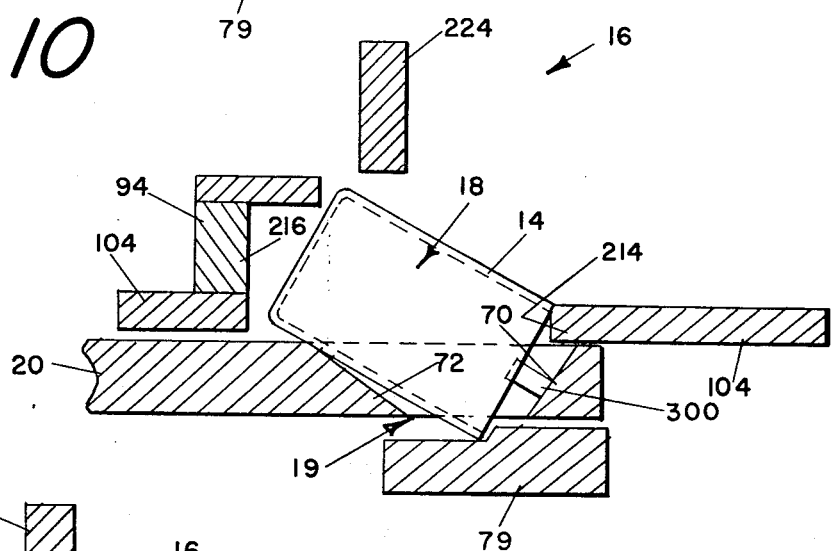
Figure 12:
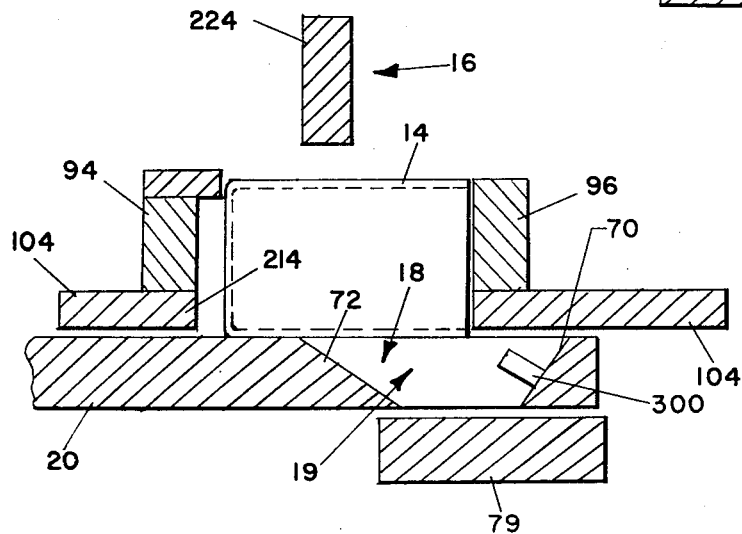

As herein shown, provision is made for rejecting a non-oriented closure from its pocket at a point near the upper end of the inclined carrier and prior to arrival at the point of transfer from a pocket to the supply chute 16. As shown in FIG. 7, an air jet 302 is disposed at the upper end of the inclined carrier at a point preceding the mouth of the chute. In operation, it will be seen that the continuous stream of air from the jet 302 is directed above a point which would affect a fully seated oriented closure. It will also be observed that a closure in its elevated position at the upper end of the carrier is in a position of balance such that it can be easily rejected with a minimum of force.

The air jets 74, 76 also effect rejection of a closure which may be bridged across a radially arranged pocket and held between closures seated in adjacent pockets, the rejected closures being returned to the group at the lower end of the carrier to be again carried upwardly by the carrier.

Those closures which are rejected at the upper half of the carrier 12 are retained by radially arranged flights 90 attached to the moving carrier 12. Such closures are released by gravity into the lower end of the carrier. Such control of the release of the rejected closures serves to distribute the same into an area preceding the flow of closures from the feed hopper so as to afford smooth operation.

The oriented closures which arrive at the upper end of the inclined carrier 12 are transferred from their pockets 18 into the mouth or open end 92 of the chute 16. As herein illustrated, the chute is supported on a base plate 104 attached to the underlying frame members 28, 30, the plate forming the bottom wall of the chute. In order to lift the oriented closure from its inclined position in its pocket to a plane parallel to the upper face of the carrier, a stationary cam 79 secured to the supporting disk 28 is arranged to engage the portion of the closure extended through the bottom opening 19 of its pocket 18 and to lift it up. As the lower end of the closure is lifted out of its pocket, it is guided between a curved portion 214 of the base plate 104 which is disposed immediately above the face of the carrier and a second curved portion 216 of the base plate 104. In operation, as the outer end of the closure is lifted up, the curved portions 214, 216 guide the closure radially inward until the closure rests on the face of the carrier, at which time the closure is guided between the inner rail 94 and an outer rail 96, both of which are attached to the base plate 104. The base plate is beveled, as indicated at 218, providing a small incline, the closure riding up the incline from the face of the carrier to the upper face of the base plate. An air jet 220 may be disposed in a position to assist successive closures to move or roll up the small incline onto the face of the plate. It will be observed that the portion of the chute in which the incline occurs is a substantially straight section as indicated at 222. It will also be observed that the chute includes a top rail 224 which is offset upwardly along its lower edge as indicated at 226 to conform to the incline in the base plate. Immediately after the closure is received on the base plate 104 and between the inner and outer rails 94, 96, and the upper rail 224, the chute is shaped at an intermediate portion 228 thereof to effect turning of the closure through 90° so as to present the closures in an upright position. The air jet 220 will assist passage of the closures through the turning section 228. After the turning operation, the chute is shaped to follow a circular path substantially concentric with the carrier, as indicated at 230, which terminates at a point substantially in line with the center line of the carrier where it is curved through 90° to follow a radial direction to a point of withdrawal, not shown.

Figure 13:
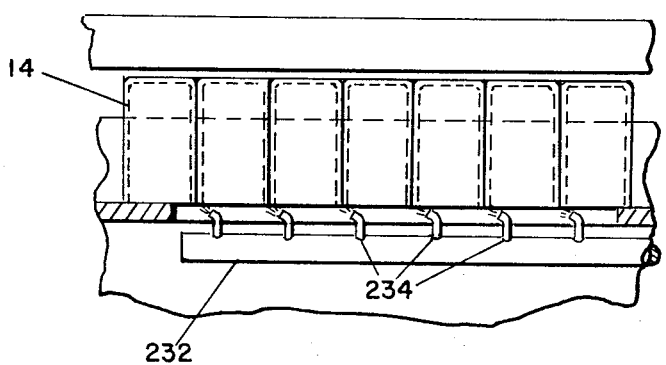
FIG. 13 is a side elevation partly in cross section as seen from the line 13—13 of FIG. 1 showing a portion of a manifold associated with the chute.
Figure 6:
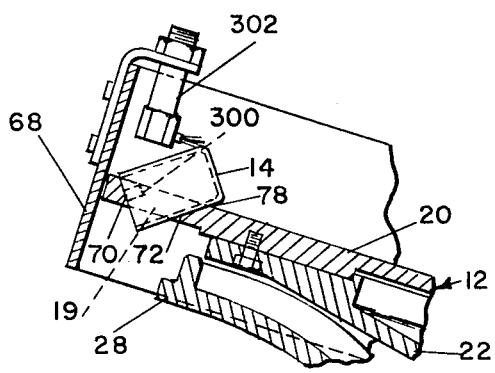
FIG. 6 is a cross sectional detail view taken on the line 6—6 of FIG. 1 showing a closure in an oriented position at the rejecting station.

In practice, air jets may be used in any portion of the chute where necessary to facilitate passage of closures therethrough. As illustrated in FIG. 13, a manifold 232 connected to a source of compressed air extends along the underside of the chute and is provided with a plurality of spaced air jets 234 directed to advance the closures through the chute.

From the above description it will be seen that the present apparatus is adapted to handle elongated cylindrical closures which are substantially greater in length than in diameter and in which the weight is substantially uniformly distributed throughout the length thereof. It will be further observed that novel provision is made for maintaining in an elevated and rejectable position in their pockets those closures which assume a reversed or non-oriented position, such provision embodying a projection from the rear wall of a pocket for engagement with the closed end of an unoriented closure.

Having thus described the invention, what is claimed is:

1. Closure handling apparatus adapted to handle elongated cylindrical closures open at one end and which are greater in height than in diameter and in which the weight is distributed substantially uniformly throughout the length thereof comprising, in combination, a rotary carrier mounted to rotate in an inclined plane, means for depositing closures at the lower end of the carrier, said carrier having radially and angularly arranged pockets formed therein to receive said closures, each pocket having an open bottom portion and provided with an end wall against which an oriented closure is seated with a portion of the closure extended through said open bottom portion, a chute having an entrance opening at the upper end of said carrier adapted to receive those closures assuming a desired position of orientation in said pockets, means for preventing seating of an unoriented closure against said end wall and for retaining the same in an elevated position in said pocket, means for rejecting those closures carried by the pockets in said elevated position, and means for transferring the oriented closures upwardly from the pockets to said chute.

2. Closure handling apparatus as defined in claim 1 wherein the means for preventing seating of an unoriented closure comprises a projection from the end wall of each pocket, those closures presenting their open ends facing said end wall passing over said projection to be seated against the end wall in an oriented position, and those closures presenting their closed ends facing said end wall being engaged by said projection to retain such closures in an elevated position in their pockets.

3. Closure handling apparatus as defined in claim 1 wherein the means for rejecting the closures assuming an elevated position in the pockets comprises an air jet.

4. Closure handling apparatus as defined in claim 1 wherein provision is made for maneuvering the closures to cause the same to assume a radial position with respect to the carrier so as to be received by a pocket, said provision including at least two air jets directed laterally and angularly upward with respect to the inclined carrier.

5. Closure handling apparatus adapted to handle elongated cylindrical closures open at one end comprising, in combination, a rotary carrier mounted to rotate in an inclined plane, means for depositing closures at the lower end of the carrier, said carrier having radially and angularly arranged pockets formed therein to receive said closures, each pocket having an end wall against which an oriented closure is seated, a chute having an entrance opening at the upper end of said carrier adapted to receive those closures assuming a desired position of orientation in said pockets, means for preventing seating of an unoriented closure against said end wall and for retaining the same in an elevated position in said pocket, means for rejecting those closures carried by the pockets in said elevated position, each of said pockets having an open bottom portion, and a stationary cam disposed beneath the carrier arranged to elevate the lower end of each closure out of its pocket and into engagement with a curved portion of the chute to dispose the closure in chute receiving position to be received into the open entrance of the chute.

6. Closure handling apparatus adapted to handle elongated cylindrical closures open at one end and having a substantially uniform distribution of weight throughout its length comprising, in combination, a rotary carrier mounted to rotate in an inclined plane, means for depositing closures at the lower end of the carrier, said carrier having radially and angularly arranged pockets formed therein to receive closures, each pocket having an open bottom portion and provided with an end wall against which oriented closures are seated, a chute having an entrance opening at the upper end of said carrier adapted to receive the oriented closures, each of said pockets having a projection extended radially inwardly from said end wall, those closures presenting their open ends facing said end wall passing over said projection to be seated against the end wall in an oriented position, and those closures presenting their closed ends facing said end wall being engaged by said projections to retain such closures in an elevated position in said pocket, means for rejecting those closures carried by the pockets in said elevated position prior to arriving at the entrance to said chute, and means for transferring the oriented closures from the pockets to said chute, said last named means comprising means engageable with the portions of the closures extended through said open bottom portion.

* * * * *